United States Patent

Pawsat et al.

[15] 3,707,319
[45] Dec. 26, 1972

[54] HANDLEBAR WITH REFLECTOR-RECEPTIVE RECESSED AREAS

[72] Inventors: Carlton P. Pawsat; Robert F. Humlong, both of Maysville, Ky.

[73] Assignee: Wald Manufacturing Company Incorporated, Maysville, Ky.

[22] Filed: Aug. 10, 1970

[21] Appl. No.: 62,451

[52] U.S. Cl. .................... 350/97, 74/551.1, 280/289
[51] Int. Cl. ............................................... G02b 5/12
[58] Field of Search ............... 350/97, 100, 288, 299; 74/551.1, 551.8; 280/289

[56] References Cited

UNITED STATES PATENTS 3,443,825  5/1969  Wolf .................................... 280/289

FOREIGN PATENTS OR APPLICATIONS 708,676    6/1966  Italy ..................................... 280/289
906,024    7/1944  France ................................ 74/551.1
1,101,222  3/1954  France ................................... 350/97

Primary Examiner—David Schonberg
Assistant Examiner—Michael J. Tokar
Attorney—J. Warren Kinney, Jr.

[57] ABSTRACT

A conventional handlebar is provided with selectively recessed portions for the reception of reflective or decorative material for thereby enhancing the visibility and attention-arresting characteristics of the handlebar.

11 Claims, 8 Drawing Figures

PATENTED DEC 26 1972
3,707,319
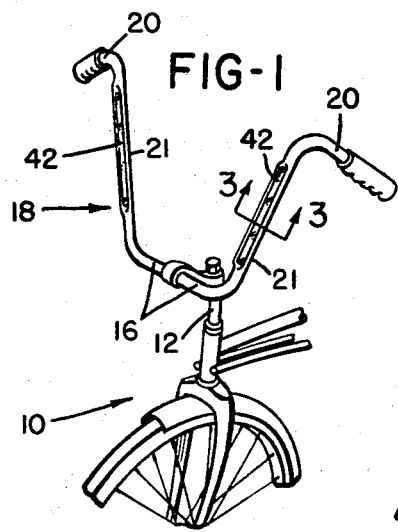
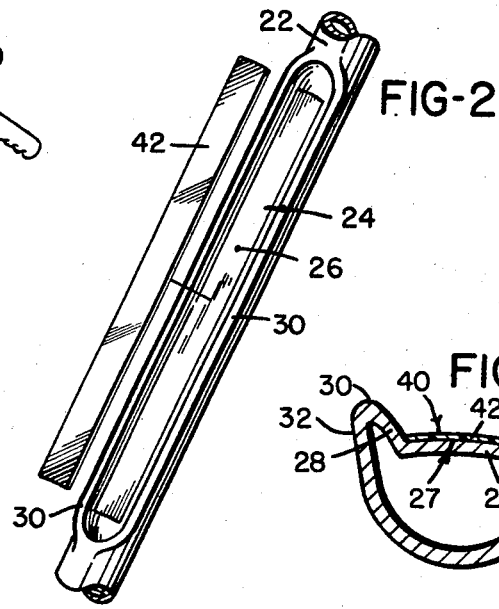
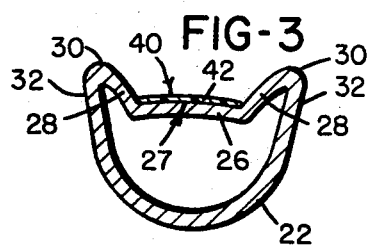
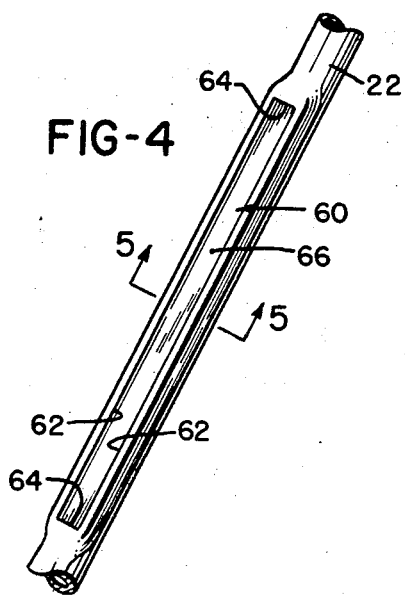
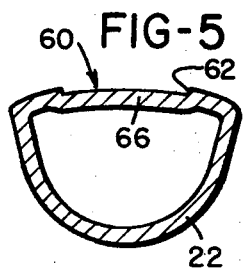
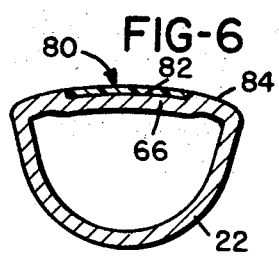
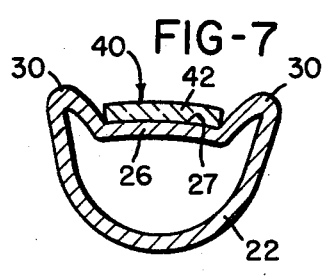
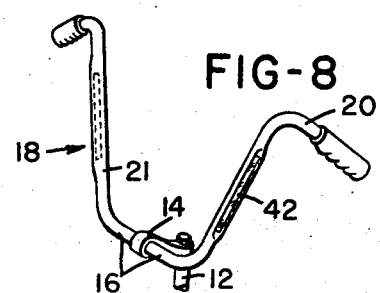
INVENTORS
CARLTON P. PAWSAT
ROBERT F. HUMLONG
BY J. Warren Kinney Jr.
ATTORNEY

HANDLEBAR WITH REFLECTOR-RECEPTIVE RECESSED AREAS

BACKGROUND OF THE INVENTION

Bicycling by persons of all age groups has been steadily increasing as has vehicular traffic in general. Accidents involving the operators of vehicles such as bicycles, motorcycles and the like have increased at an alarming rate, and many of the accidents are attributable to a greater or less degree to the inability of the drivers of other vehicles to readily see the bicycle, motorcycle or the like. The present invention is directed to simple, yet highly effective means for enabling reflective and/or decorative indicia to be provided as an integral part of a handlebar structure in such a manner as to appreciably enhance the visibility of the handlebar whereby to be clearly discernable even during the night season, in the headlights of an automotive vehicle 300 or more feet away.

SUMMARY OF THE INVENTION

The present invention is directed to conventional handlebar structures, fabricated from tubular steel stock, with selectively disposed recessed portions which are adapted to receive reflective and/or decorative indicia which is not only permanently displayed but which is protected against accidental or unintentional removal, damage and/or disfigurement.

It is therefore an object of the present invention to provide recessed areas in various portions of a conventional handlebar such as, by way of example, in the transverse horizontal section which is adapted to be adjustably clamped to the steering post of a cycle or to the riser portions and/or to the hand grip portions, or to several or all of said portions wherein said recesses are of such depth and shape as to provide an indented seat, as it were, for reflective and/or decorative indicia applied thereto.

Another object of the invention is to provide a handlebar having recessed areas, as hereinabove noted, which areas are of substantial depth for receiving reflective or decorative indicia, the outer surface of which is disposed below the adjacent peripheral portions of the handlebar.

Still a further object of the invention is to provide a handlebar structure with reflective or decorative indicia which is readily visible to observers from distances of several hundred feet, said indicia being disposed in such a manner as to attract the attention of an observer whereby the presence of the rider of a cycle provided with such a handlebar, will be readily discernable.

These and other objects are attained by the means described herein and as disclosed in the accompanying drawings, in which:

FIG. 1 is a fragmentary perspective view of a typical bicycle, having a handlebar structure embodying the teachings of the present invention, associated therewith.

FIG. 2 is an enlarged, fragmentary perspective view of a portion of a tubular handlebar structure provided with a recessed portion or area for the reception of reflective or decorative indicia which is illustrated in spaced relationship therewith, preparatory to being applied to said recessed area.

FIG. 3 is an enlarged sectional view taken on line 3—3 of FIG. 1.

FIG. 4 is a fragmentary perspective view of a portion of a handlebar provided with a modification of the present invention.

FIG. 5 is an enlarged sectional view taken on line 5—5 of FIG. 4.

FIG. 6 is a view similar to FIG. 5 with a reflective or decorative indicia operatively associated therewith and received within the recess.

FIG. 7 is a view similar to FIG. 3 illustrating reflective or decorative indicia in the form of a relatively thick member.

FIG. 8 is a perspective view of a handlebar having the reflective-decorative indicia in the outermost side surfaces of the risers, illustrating a modification of the handlebar of FIG. 1.

DETAILED DESCRIPTION

With reference to FIG. 1, the numeral 10 indicates generally the forward portion of a bicycle frame which supports a steering post 12 which includes a clamp portion 14 adapted to engage a mounting ferrule, not illustrated, which is disposed centrally of the horizontal or transverse bearing portions 16 of the handlebar structure denoted generally by the numeral 18.

The handlebar illustrated in FIGS. 1 and 8 is of the high-rise type, so called by reason of the fact that the hand grip portions 20—20 are disposed at a substantial elevation above the central transverse or bearing portions 16, to which the hand grip sections are inter-connected by means of inclined riser portions 21. It will be understood that the particular overall shape or configuration of the handlebar illustrated is merely exemplary rather than restrictive of the type or types of handlebars contemplated by the subject invention.

With particular reference now to FIGS. 2, 3 and 7, it will be noted that the initially tubular handlebar portion 22 has been deformed or upset whereby to provide a recessed portion or area 24 of substantial depth, width and length, said recessed area being defined by a bottom wall or platform 26, the opposite longitudinal side edges of which terminate in arcuate upwardly and outwardly extending side walls 28 whose upper ends are downturned as at 30, blending into the side walls 32 of tubular portion 22.

Uniformly satisfactory results have been obtained in those instances in which a backing shoe, not illustrated, having a curvature which is the compliment of the outer radius of the tubular handlebar stock 22, is associated with, viz, seated against that portion of the tubing opposite the side to be upset.

Upsetting has been satisfactorily accomplished by advancing a top die or punch having the desired dimensions and configuration, toward, against and thence into the tubing which, as already noted is supported against or by a backing shoe or the like. The die is forced into the tube to provide a recess, or pocket 24 of the desired depth and dimensions.

In the preferred embodiment of the invention, the depth of recess 24 is such that the upper surface 27 of bottom wall 26 is disposed below the tops of upper peripheral side edges 30 so as to locate and dispose the outer or upper surface 40 of reflective or decorative indicia 42 which is secured to and carried by the outer surface 27 of bottom wall 26 an appreciable distance below said peripheral edges 30.

It should be understood that the reflective or decorative indicia 42 may comprise a coating of paint or the like, or it may comprise an elongate strip of metal, plastic, cloth, paper or other suitable material having reflective or decorative qualities wherein the strip is cemented or otherwise adhered to the outer surface 27 of bottom wall 26 of the recess.

With particular reference to FIGS. 3 and 7 it will be noted that bottom wall 26 of the recessed area is substantially flat but slightly curved in a convex direction whereby to impart desired divergency to light rays reflected from the outer surface of indicia 42 which is provided with the same convex curve as wall 26.

From the foregoing, and with particular reference to FIGS. 2, 3 and 7 it will be noted that recess 24, and the reflective-decorative indicia 42 received therein are completely circumscribed or framed by elevated peripheral edges 30 which not only effectively protect indicia 24 but which also provide a neat, attractive frame for said indicia.

In FIG. 7 the reflective-decorative indicia 42 has been illustrated as a relatively thick plastic or glass reflector member adhesively secured to the outer surface 27 of bottom wall 26. It should be understood that if desired, indicia 42 could be secured to wall 26 by means of screws, or other fastening means in lieu of adhesives.

In the modification illustrated in FIGS. 4, 5 and 6, a relatively shallow recessed area 60 has been embossed into a surface of tubing 22, said recess being defined by a bottom wall 66, a pair of laterally spaced side edges 62 and axially spaced end edges 64.

As best illustrated in FIG. 6 the depth of recess 60 is such that the outer surfaces 80 of reflective-decorative indicia 82 housed within said recess, is substantially in the plane of the outer surface 84 of that surface of the handlebar tube 22 in which recessed area 60 is disposed.

As clearly evident from FIGS. 5 and 6 bottom wall or platform 66 of recess 60 while substantially flat is nevertheless slightly curved in a convex direction whereby to impart desired divergency to light rays reflected from the outer surface 80 of indicia 82.

It should be understood that the invention contemplates the provision of reflector-decorative indicia within recesses located in the horizontal portions 16 of a handlebar as well as in the hand grip portions 20. The invention likewise contemplates the provision of a plurality of shorter reflective-decorative indicia receptive recesses in the front and/or outer side surfaces of the riser portions of a handlebar as well as the provision of such surfaces in the front and side surfaces of a riser.

It is proposed also that the handlebar risers be provided each with two sets of depressions and inserts, one set being visible mainly from the front of the cycle and the other set being visible mainly from the side. Also, as an alternative, the depression and insert carried by one riser of the handlebar might be visible mainly from the front, whereas the second depression and insert carried by the other riser of the same handlebar might be visible mainly from the side.

The riser sections of a high rise handlebar are subject to considerable animation when the cycle is in use, due to side sway of the cycle frame, wherefore the inserts if reflective, will have considerable motion imparted thereto for attracting the attention of operators of any approaching vehicles equipped with headlights.

As clearly illustrated in the various sectional views the overall or maximum width of the tubing where indented and recessed exceeds the diameter of the tubing, and the bottom wall of the various recessed portions provides a substantially flat, but slightly convex surface the width of which approximates or exceeds the radius of the tubing from which the handlebar was fabricated.

What is claimed is:

1. A tubular bicycle handlebar structure having a substantially cylindrical cross-section, portions of which are depressed and deformed lengthwise to provide a relatively wide side thereon, an indented, elongate recess formed in said side and having a bottom, side and end walls, the bottom of said recess having a width at least approximating the cross-sectional radius of the tubular handlebar, and separate reflective means carried in said recess to enhance the visibility of the handlebar and render the bicycle readily discernable to a viewer, the upper edges of the side and end walls defining a frame circumscribing the recess to protect the reflective means.

2. A device as called for in claim 1 wherein the bottom wall of the recess is substantially flat.

3. A device as called for in claim 1 wherein the bottom wall of the recess is slightly convex.

4. A device as called for in claim 1 wherein the depth of the recess is such as to dispose the outer surface of the reflective means carried therein below the upper edges of the side and end walls.

5. The device as called for in claim 1, wherein the reflective means covers the major portion of the bottom wall of the recess.

6. A device as called for in claim 1, wherein the handlebar comprises a high rise handlebar having a transverse tubular bearing section fixed to a steering post clamp; a pair of tubular hand grip sections; and a pair of elongate inclined hollow tubular risers interconnecting each hand grip section with said bearing section; said depressed and deformed portions being in at least one of said tubular portions, and said reflective means comprises indicia secured to and carried by the bottom wall of the recess.

7. The device described in claim 6 wherein said bottom wall of said recess is convexly curved between the side walls thereof.

8. The device described in claim 6 wherein the upper ends of the side and end walls of the recesses are disposed outwardly beyond the outer surface of the indicia secured to the bottom wall of said area.

9. The device described in claim 6 wherein the said indicia comprises a painted surface.

10. The device described in claim 6 wherein the said indicia comprises a strip of reflective material adhesively secured to and covering the major portion of the bottom wall of the recess.

11. The device described in claim 6, wherein the said indicia comprises a plastic reflector.

* * * * *